April 13, 1965 M. S. MILLHOUSE ETAL 3,177,534
CUSHIONED SEALING STRIP
Filed Nov. 13, 1962
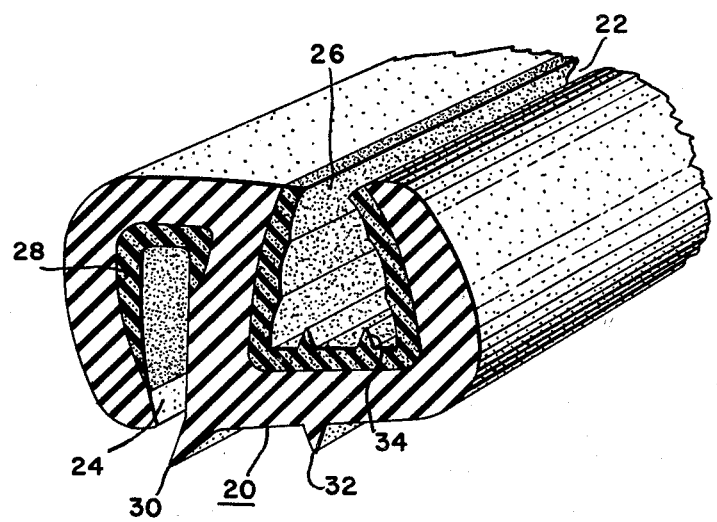
INVENTORS
MURRAY S. MILLHOUSE
WILLIAM E. LYNCH
BY
THEIR ATTORNEY

United States Patent Office 3,177,534
Patented Apr. 13, 1965

3,177,534
CUSHIONED SEALING STRIP
Murray S. Millhouse and William E. Lynch, Dayton, Ohio, assignors to General Motors Corporation, Detroit, Mich., a corporation of Delaware
Filed Nov. 13, 1962, Ser. No. 237,051
1 Claim. (Cl. 20—69)

This invention relates to a sealing strip and is particularly concerned with sealing strips for use with large areas of panels and the like.

It is an object of this invention to provide a sealing strip for use in supporting and sealing a large glass pane, for example a windshield for an automobile.

In carrying out the above object, it is a further object to provide a sealing strip wherein the glass receiving groove is lined with a softer material than the material used in the remainder of the sealing strip whereby greater flexibility is obtained with respect to size of glass pane to be sealed. In some instances the groove by which the sealing strip is attached to the supporting member, for example, the body of the car may also be lined to improve the flexibility situation.

A still further object of the invention is to provide a sealing strip having a pair of opposed grooves therein, one of which is adapted to carry a pane of glass, said sealing strip normally encompassing a pane of glass to completely carry and seal same, said sealing strip having a lining in both grooves of a softer more flexible material than the material used in the remainder of the strip.

Further objects and advantages will be apparent, reference being had to the accompanying drawings wherein a perspective view of a sealing strip is shown.

The sealing of automotive windshields has always created problems in the past. These windshields are carried by the body and must be sealed against leakage of rain being driven through the joints between the body and the windshield when the automotive vehicle is moving at high speed. Furthermore, the sealing strip must be of such a resiliency that transmission of excessive road shocks is reduced to a point that the windshield is protected against breakage. In Eichner Patent 2,189,138, a very satisfactory type of sealing strip is shown. In this patent another of the many problems found in sealing automotive windshields is noted wherein the difficulty of installing the windshield is lessened by the ability to turn down a sealing lip for insertion of the windshield into the sealing strip groove as noted in FIGURE 6.

While the Eichner patent produced highly satisfactory sealing strips for many years, it became apparent, with the advent of curved windshields, that the previous difficulties were greatly magnified. These difficulties came about due to the inability of the glass manufacturers to maintain the curvature of the windshield within narrow limits. Thus, the curvature varied considerably from one windshield to the next and since the aperture of the automotive body was fixed, it was necessary to provide means for compensating for the inaccuracies in dimension within the sealing strip.

In Clingman Patent 2,736,404 assigned to the assignee of this invention, one of the many expedients for adjusting misalignment between the windshield and the body is shown. In this instance the glass receiving groove is more or less cradled in the strip but permits considerable movement thereof in accordance with the specific shape of the glass.

Unfortunately, in all instances where any great amount of latitude or self-adjustment was provided in the sealing strip the tendency toward leakage of rain around the glass was greatly increased whereby difficulties were frequently experienced necessitating in many instances the use of sealing compounds in liquid or semi-liquid form being placed within the grooves of the glass prior to the installation of the windshield in the body. This necessitated cleaning off the excess sealing compound which increased the cost of the operation and made replacement of windshields more difficult since the glass receiving groove generally became roughened by the sealing compound when it was removed after solidification.

The present invention is directed specifically to overcoming these past difficulties whereby a sealing strip is provided which permits considerable variation in windshield contour or dimension, which offers high sealing qualities over any and all conditions without the additional use of sealing compound and which cushions the glass against excessive road shock.

Referring to the drawing a sealing strip 20 includes a glass receiving groove 22 and a panel receiving groove 24 in opposed relation to one another and running longitudinally of the strip. Within these grooves is a cushion lining designated at 26 within grooves 22 and 28 with groove 24. This cushion lining is formed from a softer material than that used in the remainder of the strip. This is important since the hardness of the rubber or other elastomer used in the strip must be closely controlled to provide sufficient rigidity whereby the windshield is maintained in condition under any and all conditions. Thus, the basic compound of the strip is preferably in the order of from 50-70 hard durometer rubber or other elastomer which offers sufficient rigidity for the purpose. The cushion lining within the grooves 22 and 24 on the other hand is preferably in the order of from 20-40 hard durometer reading. This offers soft panel receiving groove linings which conform readily to the shape of the panels and which seal effectively due to their high degree of resilience. The remainder of the strip being substantially harder maintains the glass panel in the desired position with respect to the body which carries the panel.

Strips of this character may be manufactured by several known means, for example, the strip may be extruded and the lining may be extruded directly within the grooves by using a cross-head extruder with two supplies of different durometer rubbers. If desired, the strip may be extruded of a single durometer rubber and the groove linings may be extruded separately and then positioned within the groove and the entire strip cured with mold sections in the grooves whereby the lining is integrated with the remainder of the strip through vulcanization. Similarly, the linings may be cemented into the strip if desired although this expedient is not recommended due to the relatively higher overall cost of manufacture. In fact, it is quite apparent that the co-extrusions of the two durometer reading elastomers into an integrated strip is by far the best method to follow.

While the drawing shows the grooves 22 and 24 spaced laterally from each other in the same plane, it is apparent that the grooves may be spaced vertically with respect to one another. These deviations are dictated by the mode of application and the position of the glass panel with respect to the metal receiving aperture. Similarly, various sealing ribs such as shown at 30, 32 and 34 may be provided at various portions of the strip as desired and required. These expedients all come within the purview of one skilled in the art and form no part of this invention.

While the embodiments of the present invention as herein disclosed constitute preferred forms, it is to be understood that other forms might be adopted.

What is claimed is as follows:

A cushioning connector for joining adjacent edge portions of panels to be joined, comprising a strip of elastomeric material having a pair of opposed and spaced grooves running longitudinally thereof, said strip being formed of an elastomer having a predetermined hardness, relatively thin preformed elastomeric linings within each of said grooves, said linings being considerably softer than the remainder of the strip and fully integrated with the remainder of the strip, said linings providing cushioning means for the edge portions of the several panels connected by the strip whereby small variations in dimension of the panels are overcome with respect to joining the same.

References Cited by the Examiner
UNITED STATES PATENTS

| | | | |
|---|---|---|---|
| 1,655,874 | 1/28 | Nicholson | 20—69 |
| 2,017,556 | 10/35 | Westrope | 296—44.5 |
| 2,736,404 | 2/56 | Clingman | 189—78 |
| 2,781,561 | 2/57 | Gifford et al. | 20—56.4 |
| 2,945,268 | 7/60 | Takenska et al. | 20—56.4 |
| 3,029,481 | 4/62 | Henniges | 20—69 |
| 3,037,810 | 6/62 | Kelley | 20—56.4 |

FOREIGN PATENTS 957,068  1/57  Germany.

HARRISON R. MOSELEY, *Primary Examiner.*
BENJAMIN BENDETT, *Examiner.*